United States Patent Office 3,448,952
Patented June 10, 1969

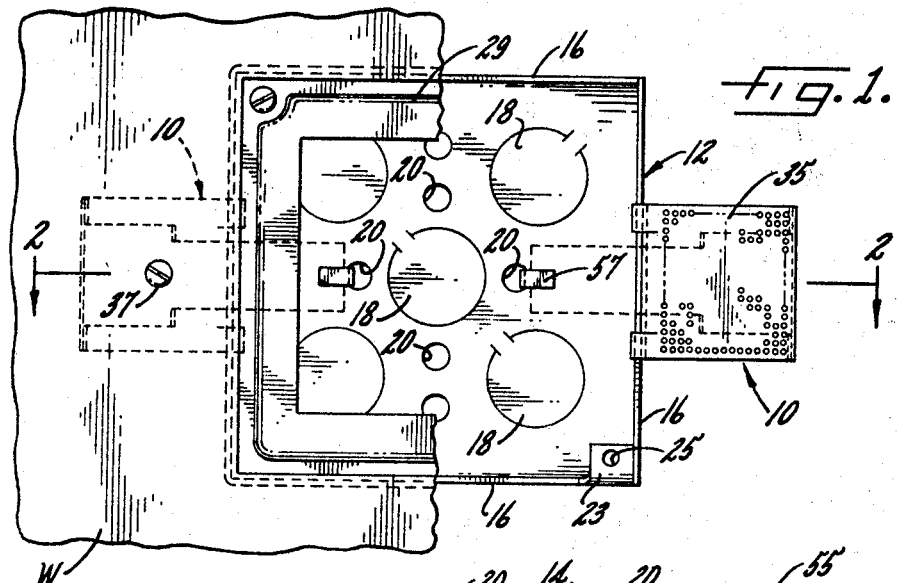
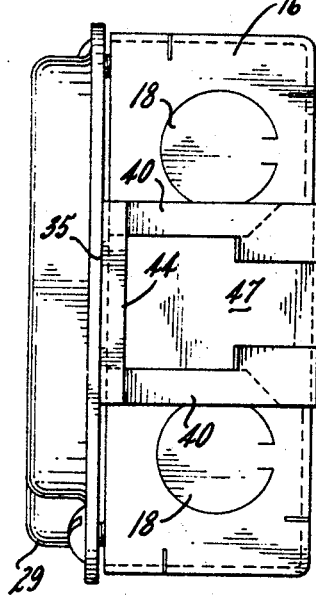
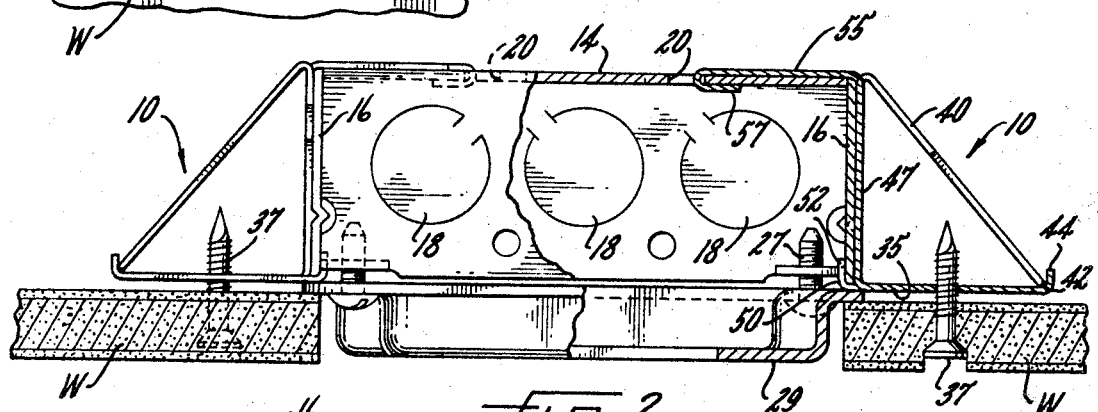
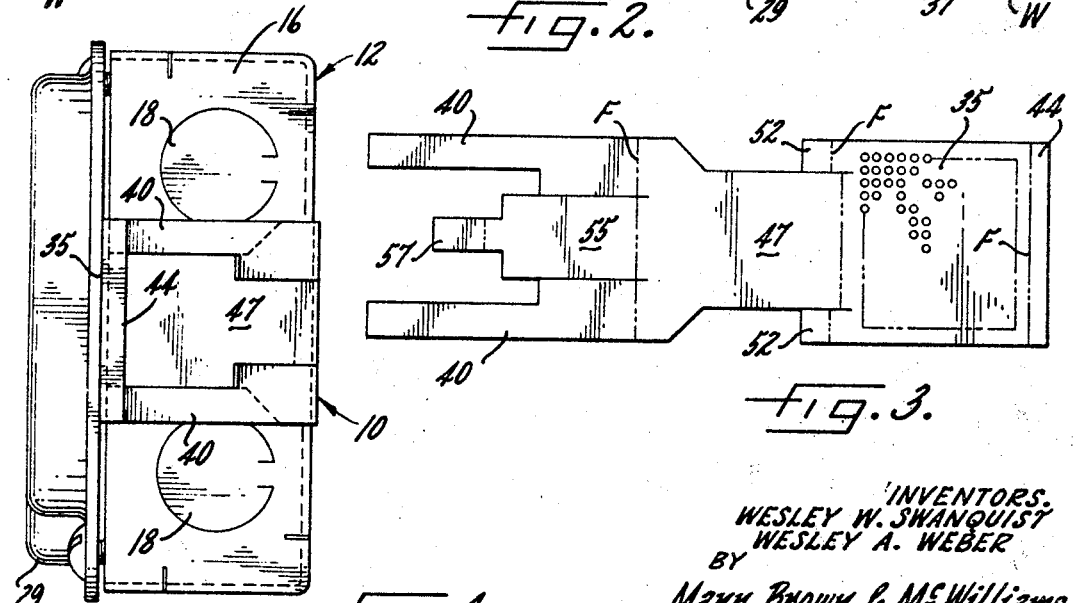

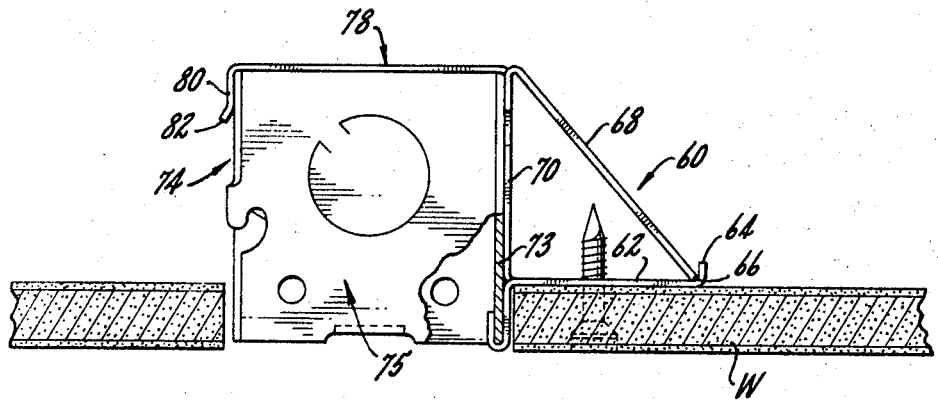
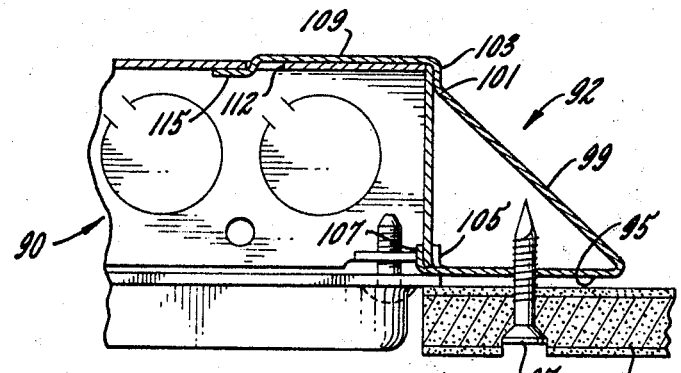
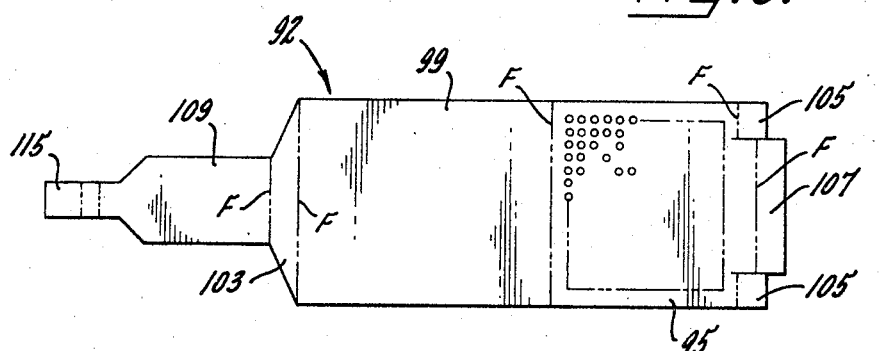

3,448,952
ELECTRICAL BOX MOUNTING CLIP
Wesley W. Swanquist, Oswego, and Wesley A. Weber, Aurora, Ill., assignors to All-Steel Equipment Inc., a Corporation of Illinois
Filed Sept. 14, 1965, Ser. No. 487,191
Int. Cl. E04g *17/18;* B42f *13/00;* H02g *3/08*
U.S. Cl. 248—27                                                         3 Claims

ABSTRACT OF THE DISCLOSURE

A clip for mounting an electrical outlet box of the type having a bottom wall and upstanding side walls, the walls having knock-outs to form holes therein, the clip comprising a broad mounting member adapted to engage the reverse side of the supporting wall, a channel at one end of the mounting member for receiving an edge of a side wall therein, a support member connected between the end of the mounting member opposite the channel and the side wall in the channel at a place thereon adjacent the intersection of the side and bottom wall of the box and a member extending from the support member parallel with the bottom wall.

---

The following disclosure contains a correct and full description of the invention and of the best mode known to the inventor of taking advantage of same.

The present invention relates to improvements in mounting and securing conventional electrical outlet boxes to dry wall constructions or the like.

It is an objective of the present invention to provide an improved mounting clip which is readily engageable with a conventional box, and easily connected to dry wall or the like so as to hold the box in any desired position rigidly in place.

Another objective of the invention is to provide a clip for securing conventional outlet boxes to dry wall type constructions, the clip itself being readily formed by inexpensive stamping and bending processes from a one-piece blank, and which is particularly strong and durable, in addition to being readily secured directly to the box. An objective related to the foregoing is the provision of the improved clip which is mountable to any one of the side walls of the box and is, therefore, nondirectional in its use.

These and other objects and advantages of the invention will be clearly disclosed in the following detailed description when taken in conjunction with the drawings, wherein:

FIG. 1 is a front elevation of a conventional square outlet box shown mounted to a section of dry wall by means of clips constructed in accordance with the present invention, a portion of the dry wall being removed to illustrate the clip with greater clarity;

FIG. 2 is a section of the outlet box of FIG. 1, taken along lines 2—2 partially fragmented to facilitate recognition of certain structural features of the clip of the present invention, as well as the particular mode of connection with the box itself;

FIG. 3 illustrates a blank from which a clip of the present invention is formed;

FIG. 4 is a right side view of an outlet box having a clip mounted thereto and illustrating details of the construction thereof;

FIG. 5 is a view, similar to FIG. 2, of a modified clip adapted for use with smaller outlet boxes;

FIG. 6 is a view similar to FIG. 5, illustrating still another embodiment of the clip of the present invention; and FIG. 7 is illustrative of the blank from which the clip of FIG. 6 is formed.

While the invention is susceptible of various modifications and alternative constructions, certain illustrative embodiments have been shown in the drawings and will be described below in considerable detail. It should be understood, however, that there is no intention to limit the invention to the specific forms disclosed, but, on the contrary, the invention is to cover all modifications, alternative constructions and equivalents falling within the spirit and scope of the invention as expressed in the appended claims.

Turning now to the drawings, and with particular reference to FIG. 1, there is shown a pair of clips 10, constructed in accordance with the present invention, and engaged with an electrical outlet box generally indicated at 12. The box as illustrated is of conventional construction, and comprises ( by reference to FIG. 2) a bottom wall 14 terminating at its edges in perpendicular side walls 16. As is customary in such constructions, the bottom wall and side walls are provided with a plurality of knock-outs 18, and in order to enhance the versatility of the box, a number of screw holes 20 are provided in the bottom and side walls. These holes are usually provided to permit convenient fastening of the box to studding or other construction elements, as well as permitting conduit clamps and the like to be secured to the box itself on the job. In opposite corners of the particular box illustrated, there are formed inturned ears 23, having a hole 25 therein which receives a screw 27 for fastening a cover member 29 to the box to close the same.

It is sometimes desirable that outlet boxes of the type illustrated be mounted so as to permit the extremities thereof to remain flush with the visible surface of the wall W to which it is attached.

In accordance with the present invention, the clips 10 engage the box 12 so as to permit it to be mounted in any convenient position to the back side of the wall board W in position so that the cover member 29 is approximately flush with the visible face of the wall and is disposed within the hole that is formed in the wallboard to accommodate the box 12. Thus, with no modification required to the box itself, the clip 10 is readily mounted thereon, and provides an exceptionally strong device which is readily secured to the back side of the dry wall to mount the box.

More particularly, the clip 10 comprises a flat mounting face or portion 35 which is connected to a side wall 16 of the box and extends laterally outward so as to be parallel to the rear surface of the dry wall or paneling to which the device is to be connected. The mounting portion presents a rather substantial area to the wall, thereby permitting a certain amount of leeway in effecting attachment of the clip to the wall, which may be quickly accomplished by means of nail type fasteners 37. By this construction, it is not necessary to align pre-drilled holes, and fastening is accomplished simply by driving the fastener through the dry wall and into the face 35.

In order to maintain face 35 in a substantially rigid plane parallel to the wall W, a supporting surface or web, in this embodiment comprising struts 40, extends forwardly from the side wall 16 adjacent the bottom wall of the box, and outwardly against a shoulder 42 provided at the outer edge of the mounting face 35 by bending the terminal portion 44 thereof rearwardly. The struts 40 in the embodiment disclosed, are a continuation of a flush support member 47 which extends from the portion of the face 35 immediately adjacent the side wall 16 of the box to which the clip 10 is attached and rearwardly, along the side wall 16 to a position substantially parallel with the bottom wall 14 of the box.

In order to permit the clip to be readily secured to the box at the job site without requiring additional fasteners or special tools, the clip is provided with hooks 50 on either side thereof which are, in the present construction, an extension of the face 35 having the terminal ends 52 thereof bent upwardly (as seen in FIG. 2) into a plane substantially parallel with the support 47 and at a distance therefrom approximately the thickness of the wall 16. Thus, a channel is provided between the hooked end 50 and the flush support 47, into which the outer edge of the wall 16 is snugly fitted.

Still additional clip engagement is provided by means of a bottom wall engaging finger member 55 which extends from the juncture of the supporting member 47 and the struts 40 along the bottom wall 14 of the box where the terminal portion thereof is a tongue 57 which is inserted through one of the screw holes 20 already provided. The tongue 57 way be bent back upon itself, or forwardly, in either case, gripping the bottom wall, an operation which may be accomplished by use of any tool at hand. The clip is thus firmly secured to the box itself. It will now be apparent that with the clip firmly secured to the side and bottom walls of the box, and by virtue of the struts 40, the face 35 being rigidly supported in a lateral posture with respect to the box, the box is readily securable to the wall W with a minimum of effort, and in any convenient position which the particular task calls for.

It is a feature of the present invention that the clips which form the subject matter thereof, may be so simply and inexpensively formed that their cost and use is nominal and does not add noticeably to the cost of the electrical hardware involved in a particular task, and, in fact, by virtue of their great utility, actually reduce the labor cost involved.

Referring to FIG. 3, a prepunched blank is illustrated from which the clip 10 is formed by simple bending operations. The various parts of the clip as identified hereinabove have been identified on the blank and the fold lines or bend lines have been indicated by the letter F.

Conventional boxes vary in size from that illustrated in FIG. 1 or may not have suitable holes in the bottom wall. The clip of the present invention is readily modified to accommodate various sizes of boxes, and a modification satisfactory for smaller boxes is illustrated in FIG. 5. Because the clip illustrated in FIG. 5 is identical in most respects to that of FIG. 1, it will not be necessary to disclose in detail the inter-relationship of the various parts of the device. Thus, the clip, indicated generally at 60, comprises a broad mounting face portion 62 which has its outer terminal portion 64 bent to define a shoulder 66 which is engaged by supporting struts 68 extending at an acute angle upwardly from the bottom wall of the box where it is joined with a flush support surface 70 disposed against the side wall 73 of the box 75 to which it is joined.

In order that the box and clip may be readily engaged and disengaged without permanent deformation of the clip, as required for example in FIG. 1, a bottom wall engaging member 78 is provided, which, in keeping with the invention, extends from the juncture of the members 70 and 68 flush with the bottom of the box, is adapted to extend the full width of the box to provide snap-on engagement which is accomplished by a gripping end portion 80 formed at the end of the member 78. By virtue of the material from which the clip is constructed, the end portion 80 is sufficiently resilient so as to grippingly engage the box pressing the wall 73 against the member 70 to firmly hold the box in position with respect to the clip. The terminal portion 82 of the gripping end portion 80 is bent outwardly somewhat to facilitate engagement of the end onto the box itself.

In order that the box illustrated in FIG. 5 might be mounted flush with the face of the wall W, without the cover plate being applied, the end portions 75 which engage the side wall of the box 73 is extended at a right angle with the face 62 parallel with the side wall for a distance approximating the thickness of the wall W. The ends are then hooked over the forward edge of the wall 73 of the box to engage the same in a manner similar to that discussed with respect to the previous embodiment.

FIG. 6 is illustrative of still another clip arrangement of somewhat simplified form. In that figure, a box indicated generally at 90 is engaged by a novel clip 92 which is conveniently formed from the blank illustrated in FIG. 7. The clip of FIG. 6 is adapted to mount the box 90 behind the wall W, but it will be appreciated that this structure might be modified in a manner such as the clip of FIG. 5 to permit flush mounting of the box with respect to the wall.

The clip 92 comprises a mounting face 95 adapted to receive a suitable fastener 97 to hold the clip to the wall. The clip is preferably of one piece construction, and is provided with a supporting strut 99 extending at an angle with the face and terminating in a shoulder 101 short of the bottom end of the box 90 where it flattens out into a short box abutting section 103. The face portion, of course, grips the side wall of the box at its edge. This is accomplished by means of a pair of serially spaced inturned flanges 105 and 107 which are disposed from one another by a distance approximating the thickness of the side wall. A box bottom engaging portion, in accordance with the invention, is formed at right angles from the abutting wall 103, and bears the identifying character 109. The bottom engaging portion 109 terminates in a shallow S-shaped bend 115 which is adapted to be received in the prepunched hole 112 in the bottom wall of the box, and by virtue of its position, applies pressure directly against the bottom of the box to hold the clip in place. The clip, it will be appreciated, is readily secured to the box by simply inserting the end portion 115 into the aperture 112 and then flexing the clip so that the flanged portions 105 and 107 are fitted over the side wall of the box.

In all of the embodiments disclosed herein, it is preferred that all of the mounting portions or faces of the respective clips be pebbled so as to permit virtual self-finding engagement with the fastener used to draw the clip against the back surface of the wall. This may best be seen in FIGS. 1, 3 and 7, and is common to each of the clips disclosed, although not a necessary attribute thereof. The clips themselves may be conveniently formed of 26 guage mild steel. As pointed out, each of the clips permit rapid, on the job engagement, with an outlet box for ready mounting to dry wall or other paneling in a manner which greatly reduces the expense and time required to perform tasks of this type.

We claim as our invention:

1. A clip for mounting an outlet box of the type having a bottom wall and upstanding side walls, said walls having knockouts and holes formed therein, said clip comprising a broad mounting surface member for receipt of a fastener, an end of said member having a pair of mutually parallel bent portions defining a channel between them for receipt of the edge of one side wall of a box, one of said bent portions defining a support member adapted to extend along the box side wall to a position adjacent the intersection thereof with the bottom wall of the box, a strut extending at an angle with respect to said support member and engaged with the free end of said mounting member, said free end being bent to define a shoulder for holding said strut in place, and means extending from said support member for grippingly engaging the bottom wall of the box.

2. A clip as set forth in claim 1 wherein said means extending from said support member terminates in a tongue, said tongue being adapted to be engaged with the bottom wall of the box by passing through a hole therein.

3. A clip as defined in claim 1 wherein said means extending from said support member extends the width of the box, and terminates in a resilient flange adapted to grippingly engage a side wall of the box so as to squeeze the box between said flange and said support member.

References Cited

UNITED STATES PATENTS

| | | | |
|---|---|---|---|
| 1,066,706 | 7/1913 | Caine | 220—3.4 |
| 2,586,728 | 2/1952 | Shepard. | |
| 2,753,141 | 7/1956 | Weber | 248—27 |

ROY D. FRAZIER, *Primary Examiner.*

J. FRANKLIN FOSS, *Assistant Examiner.*

U.S. Cl. X.R.

220—3.5; 248—343